RESTRICTED SERVICE TELEPHONE SYSTEM
Filed May 22, 1947
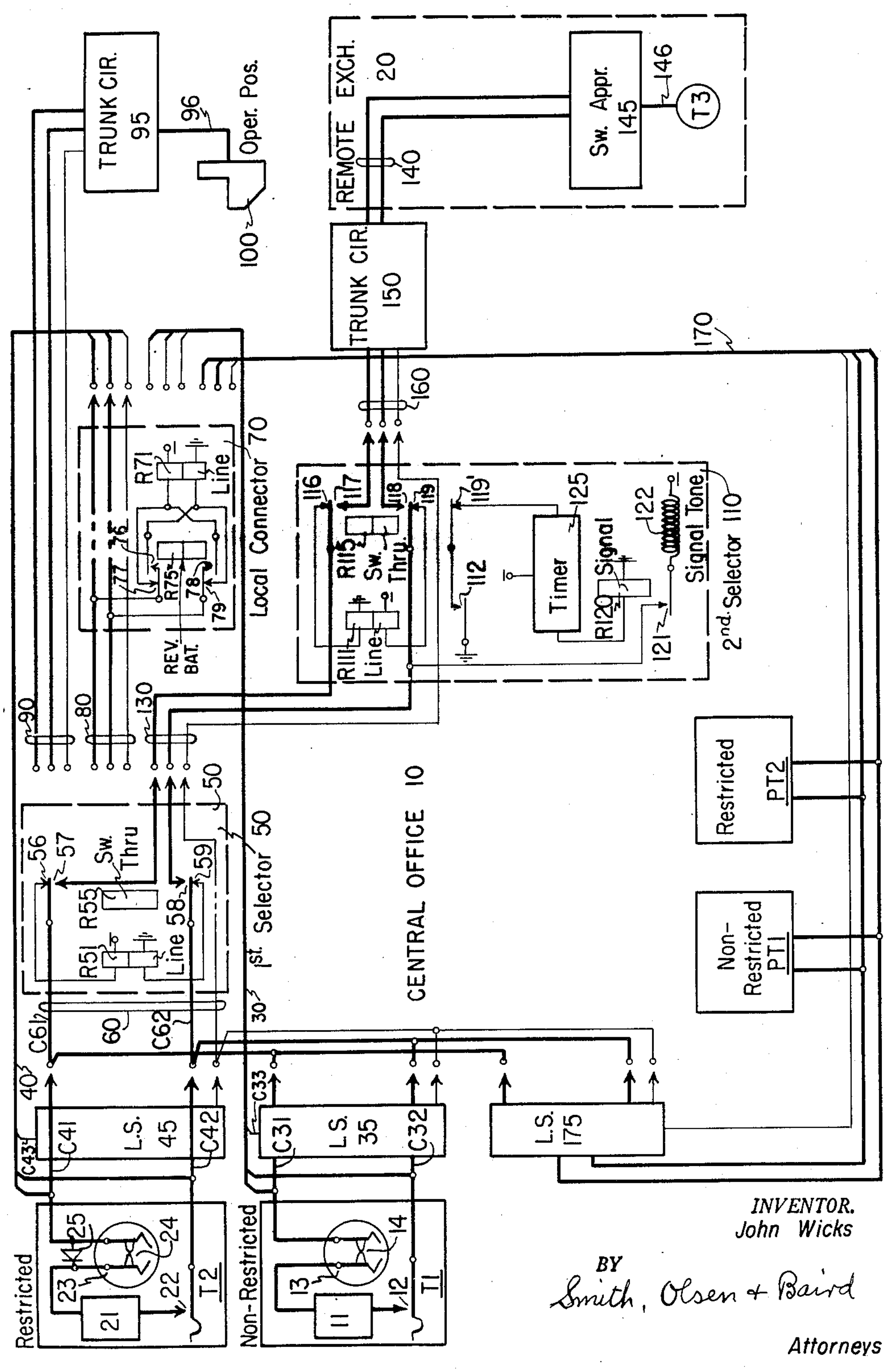
INVENTOR.
John Wicks
BY
Smith, Olsen & Baird
Attorneys Patented Aug. 22, 1950 2,519,867

UNITED STATES PATENT OFFICE 2,519,867

RESTRICTED SERVICE TELEPHONE SYSTEM

John Wicks, Biloxi, Miss., assignor to Automatic Electric Laboratories, Inc., Chicago, Ill., a corporation of Delaware Application May 22, 1947, Serial No. 749,759

7 Claims. (Cl. 179—18)

The present invention relates to automatic telephone systems and more particularly to such systems in which different groups of subscriber substations are rendered corresponding different classes of service.

In an automatic telephone system serving a central office area and the adjacent suburban areas, calls from the subscriber substations in the central office area that are to be completed to subscriber substations in the suburban areas are usually first extended to an operator switchboard in the central office area and then routed by the operators thereat to the subscriber substations in the suburban areas. While this system is entirely satisfactory in operation, a large switchboard in the central office, staffed by a great number of operators, is required in order to complete the calls from the central office area to the surburban areas.

Accordingly, it is an object of the present invention to provide an automatic telephone system comprising an improved switching arrangement; whereby subscriber substations of a first class in the central office are rendered a corresponding class of service permitting them to set up connections to subscriber substations in the suburban areas, and subscriber substations of a second class in the central office are rendered a corresponding class of service preventing them from setting up connections to subscriber substations in the surburban areas.

Another object of the invention is to provide an automatic telephone system of the character described; wherein the first and second classes of service mentioned are rendered to the corresponding classes of subscriber substations regardless of whether the subscriber substations are connected to individual or party lines.

Another object of the invention is to provide an automatic telephone system of the character described that includes subscriber substations of first and second classes that are connected to the same party line and rendered corresponding first and second classes of service.

A further object of the invention is to provide an automatic telephone system in which different classes of service are rendered to subscriber substations; wherein the classes of service are selectively established by an improved arrangement including apparatus provided at the subscriber substations.

A further object of the invention is to provide an automatic telephone system in which different classes of service are rendered to subscriber substations; wherein the classes of service are selectively established by an improved arrangement including different types of digit transmitting mechanism provided at the subscriber substations.

A still further object of the invention is to provide in a telephone system including a plurality of automatic switching stages, wherein an advanced switching stage supplies current of a polarity opposite to that of a preceding switching stage, an improved arrangement comprising an asymmetrical current conducting device disposed at subscriber substations rendered restricted service for preventing the subscriber substations mentioned from controlling operation of the advanced switching stage.

Further features of the invention pertain to the particular arrangement of the circuit elements of the system, whereby the above-outlined and additional operating features thereof are attained.

The invention both as to its organization and method of operation, together with further objects and advantages thereof, will best be understood by reference to the following specifications taken in connection with the accompanying drawing in which the single figure illustrates the details of an automatic telephone system having incorporated therein the features of the present invention.

Referring now more particularly to the drawing, there is illustrated an automatic telephone system comprising a central office 10 and a remote exchange 20. The central office 10 is connected to the remote exchange 20 by a group of trunk lines including the trunk line 140.

The central office 10 may serve a group of several hundred subscriber lines, including both private or individual subscriber lines and party subscriber lines, provided with subscriber substations rendered two classes of service, including non-restricted service and restricted service. A first group of these subscriber lines includes the individual subscriber lines 30 and 40 and the party subscriber line 170. The individual subscriber lines 30 and 40 have the subscriber substations T1 and T2 respectively connected thereto and respectively rendered non-restricted and restricted service. The party subscriber line 170 has the subscriber substation PT1 and PT2 commonly connected thereto and respectively rendered non-restrcted and restricted service. The subscriber substations T1, PT1, etc., rendered non-restricted service, are provided with identical and conventional substation apparatus; while the subscriber substations T2, PT2, etc., rendered restricted service, are provided with identical and unique substation apparatus. For example, the subscriber substation T1 rendered non-restricted service is provided with substation apparatus including a circuit, a telephone instrument 11, a hookswitch 12 and a dial 13; the dial 13 including a pair of impulsing springs 14 serially arranged in the substation circuit connected to the line conductors C31 and C32 of the subscriber line 30. Similarly the subscriber substation T2 rendered restricted service is provided with substation apparatus including a circuit, a telephone instrument 21, a hookswitch 22 and a dial 23; the dial 23 including a pair of impulsing springs 24 serially arranged in the substation circuit connected to the line conductors C41 and C42 of the subscriber line 40. Also the substation apparatus at the subscriber substation T2 includes an asymmetrical current conducting device 25 in the form of a copper oxide rectifier bridging the impulsing springs 24 of the associated dial 23 and arranged to block the passage therethrough of substantial current of a predetermined polarity. Specifically, the device 25 blocks the passage therethrough of substantial current when the line conductors C41 and C42 of the circuit line 40 are respectively negative and positive; and permits the passage therethrough of substantial current when the line conductors C41 and C42 of the subscriber line 40 are respectively positive and negative. When the line conductors of the subscriber line 40 are so poled that the passage of substantial current through the device 25 is blocked the impulsing springs 24 of the dial 23 are capable of transmitting the impulses of a digit over the subscriber line 40 incident to operation of the dial 23. On the other hand, when the line conductors of the subscriber line 40 are so poled that the passage of substantial current through the device 25 is permitted the impulsing springs 24 of the dial 23 are effectively short-circuited and are incapable of transmitting the impulses of a digit over the subscriber line 40 incident to the operation of the dial 23. Also, each subscriber line is terminated in a line switch individual thereto; the subscriber lines 30, 40 and 170 respectively terminating in the line switches 35, 45 and 175.

Further, the central office 10 comprises a plurality of groups of first selectors, the first group of first selectors including the first selector 50 terminating the trunk 60 accessible to the line switches 35, 45, 175, etc., associated with the subscriber lines in the first group previously mentioned. Also the central office 10 comprises a plurality of groups of local connectors, the first group of local connectors including the local connector 70 terminating the trunk 80 accessible to the various groups of first selectors. The local connectors 70, etc., in the first group have access to the subscriber lines 30, 40, 170, etc., in the first group. Further, the central office 10 comprises a group of second selectors including the second selector 110 terminating the trunk 130 accessible to the different groups of first selectors.

Further, the central office 10 comprises a group of trunk circuits terminating the trunk lines in the group extending to the remote exchange 20; the trunk circuit 150 terminating the trunk line 140 and provided with a trunk 160 accessible to the second selectors 110, etc. Also the central office 10 comprises an operator position 100 terminating a group of trunks including the trunk 96. The trunks 96, etc., are terminated by trunk circuits 95, etc., respectively provided with incoming trunks 90, etc., accessible to the different groups of first selectors.

The remote exchange 20 serves a group of subscriber substations including the subscriber substation T3; and comprises automatic switching apparatus 145 of the Strowger type terminating the trunk lines 140, etc., and having access to the subscriber lines 146, etc., respectively extending to the subscriber substations T3, etc. Also the switching apparatus 145 is accessible to the subscriber substation T3, etc., via the subscriber lines, 146, etc.

Preferably in the central office 10 each of the first selectors is identical to the first selector 50 which is of the conventional Strowger type including a line relay R51 and a switch through relay R55. Preferably, each of the local connectors is identical to the local connector 70 which is of the conventional Strowger type including a line relay R71 and a reverse battery relay R75. Preferably, each of the second selectors is identical to the second selector 110 which is of the conventional Strowger type including a line relay R111, a switch through relay R115 and a signal relay R120, as well as a timer 125.

A better understanding of the connection and arrangement of the telephone system will be facilitated from the following description of the operation of the apparatus incorporated therein incident to the extension of various connections from the subscriber substations in the central office 10.

*Local calls in the central office 10*

First assuming that a call is initiated at any subscriber substation in the central office 10, such, for example, as the subscriber substation T1 rendered non-restricted service; when the call is initiated at the subscriber substation T1 by the removal of the telephone instrument 11 thereat from its associated switchhook, the hookswitch 12 is closed completing an obvious connection including the impulsing springs 14 of the dial 13 across the line conductors C31 and C32 of the subscriber line 30 extending to the line switch 35. Operation of the line switch 35 is initiated, whereby it operates automatically to select a trunk extending to an idle first selector in the associated group. For example, the line switch 35 may select the trunk 60 extending to the first selector 50; thereby to complete a loop circuit between the calling subscriber substation T1 and the line relay R51 in the first selector 50. More particularly, ground potential is applied by way of the lower winding of the line relay R51 and the contacts 59 to the line conductor C62 of the trunk 60 and by way of the line switch 35 to the line conductor C32 of the subscriber line 30; and battery potential is applied by way of the upper winding of the line relay R51 and the contacts 56 to the line conductor C61 of the trunk 60 and by way of the line switch 35 to the line conductor C31 of the subscriber line 30. When this loop circuit is completed, the line relay R51 in the first selector 50 is operated in order to condition the first selector 50 to be responsive to the first digit dialed at the calling subscriber substation T1.

The subscriber at the calling subscriber substation T1 then proceeds to operate the dial 13 in accordance with the first digit of the directory number of the called subscriber substation; whereby the impulsing springs 14 of the dial 13 are controlled to transmit a corresponding number of impulses over the above traced loop circuit to the line relay R51 in the first selector 50. The line relay R51 in the first selector 50 follows the first digit bringing about operation of the first selector 50 to select the corresponding group of local connectors and then an idle local connector therein. For example, the first selector 50 may be operated to select the trunk 80 extending to the local connector 70; whereby the switch through relay R55 in the first selector 50 is operated to interrupt, at the contacts 56 and 59, the previously traced loop circuit extending between the calling subscriber substation T1 and the line relay R51 in the first selector 50; and to complete, at the contacts 57 and 58, an alternative loop circuit extending between the calling subscriber substation T1 and the line relay R71 in the local connector 70. The loop circuit mentioned extends from ground potential by way of the lower winding of the line relay R71 and the contacts 79 to one of the line conductors of the trunk 80 and thence by way of the contacts 58 to the line conductor C62 of the trunk 60 and thence by way of the line switch 35 to the line conductor C32 of the subscriber line 30 and then to the calling subscriber substation T1; and from battery potential by way of the upper winding of the line relay R71 and the contacts 77 to the other line conductor of the trunk 80 and thence by way of the contacts 57 to the line conductor C61 of the trunk 60 and thence by way of the line switch 35 to the line conductor C31 of the subscriber line 30 and then to the calling subscriber substation T1. When this alternative loop circuit is completed, the line relay R71 in the local connector 70 operates in order to condition the local connector 70 to be responsive to the next two digits of the directory number of the called subscriber substation dialed at the calling subscriber substation T1. Assuming that the present call is to be extended to the called subscriber substation T2, the subscriber at the calling subscriber substation T1 then proceeds to operate the dial 13 in accordance with the next two digits of the directory number of the called subscriber substation T2; whereby the line relay R71 in the local connector 70 follows the two digits mentioned. Specifically, the local connector 70 operates first to select the group of subscriber lines including the subscriber line 40 extending to the called subscriber substation T2 and then to select the particular subscriber line 40 in the previously selected group. The subsequent operation of the local connector 70 depends upon the idle or busy condition of the called subscriber substation T2 at this time in accordance with conventional practice.

Assuming that the called subscriber substation T2 is idle at this time, ringing current is projected from the local connector 70 over the subscriber line 40; and when the subscriber at the called subscriber substation T2 answers the call by removal of the telephone instrument 21 thereat from its associated switchhook, the hookswitch 22 is closed completing an obvious connection including the impulsing springs 24 of the dial 23 across the line conductors C41 and C42 of the subscriber line 40. When this connection is thus completed, the local connector 70 operates to interrupt the projection of ringing current over the subscriber line 40 and switches through in order to bring about operation of the reverse battery relay R75 therein. Upon operating the reverse battery relay R75 reverses, at the contacts 76, 77, 78, and 79, the polarity of the trunk 80 with respect to the upper and lower windings of the line relay R71, and, consequently, the polarity of the line conductors C31 and C32 of the subscriber line 30 extending to the calling subscriber substation T1. This reversal of polarity over the loop circuit extending between the calling subscriber substation T1 and the line relay R71 in the local connector 70 is without particular effect, although it may be employed for metering purposes. At this time an established connection is completed between the calling subscriber substation T1 and the called subscriber substation T2.

Subsequently, when the subscriber at the called subscriber substation T2 replaces the receiver of the telephone instrument 21 thereat upon its associated switchhook, the hookswitch 22 is opened interrupting the loop circuit extending between the called subscriber substation T2 and the local connector 70; whereby the reverse battery relay R75 in the local connector 70 restores again effecting the reversal, at the contacts 76, 77, 78, and 79, of polarity over the loop circuit extending between the calling subscriber substation T1 and the line relay R71; all without effect at this time. When the subscriber at the calling subscriber substation T1 replaces the receiver of the telephone instrument thereat upon its associated switchook, the hookswitch 12 is opened interrupting the previously traced loop circuit extending to the line relay R71 in the local connector 70; whereby the line relay R71 restores effecting the consequent release of the local connector 70, the first selector 50 and the line switch 35. At this time the connection between the calling subscriber substation T1 and the called subscriber substation T2 is released and the apparatus involved thereat is completely released and available for further use.

In view of the foregoing description of the extension of a local call from the private subscriber substation T1 rendered non-restricted service, it will be understood that the extension of a local call from a party subscriber substation rendered non-restricted service will proceed in an identical manner. By way of illustration, it is noted that the extension of a local call from the calling party subscriber substation PT1 rendered non-restricted service via the party subscriber line 170, the associated line switch 175, the trunk 60, the first selector 50, the trunk 80, the local connector 70 and the subscriber line 40 to the called subscriber substation T2 is identical to that described above.

Now assuming that a call is initiated at a subscriber substation in the central office 10 such, for example, as the subscriber substation T2 rendered restricted service; when the call is initiated at the subscriber substation T2 by the removal of the telephone instrument 21 thereat from its associated switchhook, the hookswitch 22 is closed completing an obvious connection including the impulsing springs 24 of the dial 23 across the line conductors C41 and C42 of the subscriber line 40 extending to the line switch 45. Operation of the line switch 45 is initiated whereby it operates automatically to select a trunk extending to an idle first selector in the associated group. For example, the line switch 45 may select the trunk 60 extending to the first selector 50; thereby to complete a loop circuit between the calling subscriber substation T2 and the line relay R51 in the first selector 50. More particularly, ground potential is applied by way of the lower winding of the line relay R51 and the contacts 59 to the line conductor C62 of the trunk 60 and by way of the line switch 45 to the line conductor C42 of the subscriber line 40; and battery potential is applied by way of the upper winding of the line relay R51 and the contacts 56 to the line conductor C61 of the trunk 60 and by way of the line switch 45 to the line conductor C41 of the subscriber line 40. When this loop circuit is completed, the line relay R51 in the first selector 50 is operated in order to condition the first selector 50 to be responsive to the first digit dialed at the calling subscriber substation T2. In passing, it is noted that at the calling subscriber substation T2, the asymetrical current conducting device 25 bridges the impulsing springs 24 of the associated dial 23; however without effect since the polarity of the line conductors C42 and C41 of the subscriber line 40 are poled respectively + and − by the line relay R51 in the first selector 50; whereby the passage of substantial current through the device 25 is blocked so that the impulsing springs 24 of the dial 23 are capable of transmitting the impulses of the first digit dialed at the calling subscriber substation T2 over the subscriber line 40 to the line relay R51 in the first selector 50.

The subscriber at the calling subscriber substation T2 then proceeds to operate the dial 23 in accordance with the first digit of the directory number of the called subscriber substation; whereby the impulsing springs 24 of the dial 23 are controlled to transmit a corresponding number of impulses over the above traced loop circuit to the line relay R51 in the first selector 50. The line relay R51 in the first selector 50 follows the first digit bringing about operation of the first selector 50 to select the corresponding group of local connectors and then an idle local connector therein. For example, the first selector 50 may be operated to select the trunk 80 extending to the local connector 70; whereby the switch through relay R55 in the first selector 50 is operated to interrupt, at the contacts 56 and 59, the previously traced loop circuit extending between the calling subscriber substation T2 and the line relay R51 in the first selector 50; and to complete, at the contacts 57 and 58, an alternative loop circuit extending between the calling subscriber substation T2 and the line relay R71 in the local connector 70. The loop circuit mentioned extends from ground potential by way of the lower winding of the line relay R71 and the contacts 79 to one of the line conductors of the trunk 80 and thence by way of the contacts 58 to the line conductors C62 of the trunk 60 and thence by way of the line switch 45 to the line conductor C42 of the subscriber line 40 and then to the calling subscriber substation T2; and from battery potential by way of the upper winding of the line relay R71 and the contacts 77 to the other line conductor of the trunk 80 and thence by way of the contacts 57 to the line conductor C61 of the trunk 60 and thence by way of the line switch 45 to the line conductor C41 of the subscriber line 40 and then to the calling subscriber substation T2. When this alternative loop circuit is completed, the line relay R71 in the local connector 70 operates in order to condition the local connector 70 to be responsive to the next two digits of the directory number of the called subscriber substation dialed at the calling subscriber substation T2. Since the line conductors C42 and C41 of the subscriber line 40 are poled respectively + and − by the line relay R71 in the local connector 70, the passage of substantial current through the device 25 at the calling subscriber substation T2 is blocked so that the impulsing springs 24 of the dial 23 are capable of transmitting the impulses of the next two digits dialed at the calling subscriber substation T2 over the subscriber line 40 to the line relay R71 in the local connector 70.

Assuming that the present call is to be extended to the called subscriber substation T1, the subscriber at the calling subscriber substation T2 then proceeds to operate the dial 23 in accordance with the next two digits of the directory number of the called subscriber substation T1; whereby the line relay R71 in the local connector 70 follows the two digits mentioned. Specifically, the local connector 70 operates first to select the group of subscriber lines including the subscriber line 30 extending to the called subscriber substation T1 and then to select the particular subscriber line 30 in the previously selected group. The subsequent operation of the local connector 70 depends upon the idle or busy condition of the called subscriber substation T1 at this time in accordance with conventional practice.

Assuming that the called subscriber substation T1 is idle at this time, ringing current is projected from the local connector 70 over the subscriber line 30; and when the subscriber at the called subscriber substation T1 answers the call by the removal of the telephone instrument 11 thereat from its associated switch hook, the hook switch 12 is closed completing an obvious connection including the impulsing springs 14 of the dial 13 across the line conductors C31 and C32 of the subscriber line 30. When this connection is thus completed, the local connector 70 operates to interrupt the projection of ringing current over the subscriber line 30 and switches through in order to bring about operation of the reverse battery relay R75 therein. Upon operating the reverse battery relay R75 reverses, at the contacts 76, 77, 78 and 79, the polarity of the trunk 80 with respect to the upper and lower windings of the line relay R71 and, consequently, the polarity of the line conductors C41 and C42 of the subscriber line 40 extending to the calling subscriber substation T2. This reversal of polarity over the loop circuit extending between the calling subscriber substation T2 and the line relay R71 in the local connector 70 poles the line conductors C41 and C42 of the subscriber line 40 respectively + and −; whereby substantial current passes through the device 25 at the calling subscriber substation T2 effectively short-circuiting the impulsing springs 24 of the dial 23 in order to prevent the dialing of further digits at the calling subscriber substation T2. However, the short-circuiting of the impulsing springs 24 of the dial 23 at the calling subscriber substation T2 is without particular effect in the present example since no further digits are to be dialed thereat as the call has already been extended to the called subscriber substation T1. Also this reversal of polarity over the loop circuit extending between the calling subscriber substation T2 and the line relay R71 in the local connector 70 may be employed for metering purposes. At this time an established connection is completed between the calling subscriber substation T2 and the called subscriber substation T1.

Subsequently, when the subscriber at the called subscriber substation T1 replaces the receiver of the telephone instrument 11 thereat upon its associated switchhook, the hookswitch 12 is opened, interrupting the loop circuit extending between the called subscriber substation T1 and the local connector 70; whereby the reverse battery relay R75 in the local connector 70 restores again effecting the reversal, at the contacts 76, 77, 78 and 79, of polarity over the loop circuit extending between the calling subscriber substation T2 and the line relay R71; all without effect at this time. When the subscriber at the calling subscriber substation T2 replaces the receiver of the telephone instrument thereat upon its associated switchhook, the hookswitch 22 is opened interrupting the previously traced loop circuit extending to the line relay R71 in the local connector 70; whereby the line relay R71 restores effecting the consequent release of the local connector 70, the first selector 50 and the line switch 45. At this time the connection between the calling subscriber substation T2 and the called subscriber substation T1 is released and the apparatus involved therein is completely released and available for further use.

In view of the foregoing description of the extension of a local call from the private subscriber substation T2 rendered restricted service, it will be understood that the extension of a local call from a party subscriber substation rendered restricted service will proceed in an identical manner. By way of illustration, it is noted that the extension of a local call from the calling party subscriber substation PT2 rendered restricted service via the party subscriber line 170, the associated line switch 175, the trunk 60, the first selector 50, the trunk 80, the local connector 70 and the subscriber line 30 to the called subscriber substation T1 is identical to that described above.

*Trunk calls from the central office 10 to the remote exchange 20*

First, assume that a call has been initiated at the subscriber substation T1 rendered non-restricted service in the central office 10; that the line switch 35 has operated to select the trunk 60 extending to the first selector 50; that the first selector 50 is conditioned to be responsive to the first digit dialed at the calling subscriber substation T1; and that the call is to be extended to a called subscriber substation T3 in the remote exchange 20. The subscriber at the calling subscriber substation T1 proceeds to dial the first digit of the directory number of the called subscriber substation T3 in the remote exchange 20; thereby to cause operation of the first selector 50 in order to select a trunk extending to an idle second selector. For example, the first selector 50 may operate to select the trunk 130 extending to the second selector 110; whereupon the switch through relay R55 in the first selector 50 operates to interrupt, at the contacts 56 and 59, the previously traced loop circuit extending between the calling subscriber substation T1 and the line relay R51 in the first selector 50; and to complete, at the contacts 57 and 58, an alternative loop circuit extending between the calling subscriber substation T1 and the line relay R111 in the second selector 110. More particularly, ground potenial is applied by way of the upper winding of the line relay R111 and the contacts 116 to one of the line conductors of the trunk 130 and by way of the contacts 57 to the line conductor C61 of the trunk 60, and thence by way of the line switch 35 to the line conductor C31 of the subscriber line 30 extending to the calling subscriber substation T1; and battery potential is applied by way of the lower winding of the line relay R111 and the contacts 119 to the other line conductor of the trunk 130 and by way of the contacts 58 to the line conductor C62 of the trunk 60 and thence by way of the line switch 35 to the line conductor C32 of the subscriber line 30 extending to the calling subscriber substation T1. Accordingly, the line conductors C31 and C32 of the subscriber line 30 extending to the calling subscriber substation T1 are poled respectively + and − by the line relay R111 in the second selector 110; which polarity of the subscriber line 30 is without effect at the calling subscriber substation T1. When this alternative loop circuit is thus completed, the line relay R111 operates to condition the second selector 110 to be responsive to the second digit dialed at the calling subscriber substation T1; and to complete, at the contacts 112, a circuit including the contacts 119′ for extending ground potential into the timer 125; thereby to initiate operation thereof. At this point it is noted that in the event the second digit of the directory number of the called subscriber substation T3 in the remote exchange 20 is not dialed within a predetermined time interval, the timer 125 operates in order to effect operation of the signal relay R120 for a purpose more fully explained hereinafter.

The subscriber at the calling subscriber substation T1 then proceeds to dial the second digit of the directory number of the called subscriber substation T3 in the remote exchange 20; whereby the line relay R111 follows effecting operation of the second selector 110 first to select the group of trunk lines extending between the central office 10 and the remote exchange 20 and then to select an idle trunk line therein. Specifically, the second selector 110 may select the trunk 160 extending to the trunk circuit 150 terminating the trunk line 140 extending to the switching apparatus 145 in the remote exchange 20; whereupon the switch through relay R115 in the second selector 110 operates to interrupt, at the contacts 116 and 119, the previously traced loop circuit extending between the calling subscriber substation T1 and the line relay R111 in the second selector 110. Also, the switch through relay R115 completes, at the contacts 117 and 118, an alternative loop circuit extending between the calling subscriber substation T1 and the line conductors of the trunk 160 extending into the trunk circuit 150; whereby the trunk circuit 150 effects seizure of the trunk line 140 and, consequently, of the switching apparatus 145 in the remote exchange 20; whereby the switching apparatus 145 is conditioned to be responsive to a plurality of digits transmitted over the trunk line 140. Finally, the switch through relay R115 in the second selector 110 interrupts, at the contacts 119′, the previously traced path for applying ground potential to the conductor extending into the timer 125 in order to arrest operation of the timer 125 at this time.

The subscriber at the calling subscriber substation T1 then proceeds to dial the remainder of the digits of the directory number of the called subscriber substation T3 in the remote exchange 20; whereby the digits mentioned are transmitted over the above traced loop circuit to the trunk circuit 150 and therein repeated over the trunk line 140 to the switching apparatus 145 in order to cause the switching apparatus 145 to extend the call to the subscriber line 146 extending to the called subscriber substation T3 in the remote exchange 20. The subsequent operation of the switching apparatus 145 depends upon the idle or busy condition of the called subscriber substation T3 at this time in accordance with conventional practice. Assuming that the called subscriber substation T3 in the remote exchange 20 is idle at this time, the switching apparatus 145 operates in order to project ringing current over the subscriber line 146 extending thereto; and when the subscriber at the called subscriber substation T3 answers the call by removing the receiver of the telephone instrument thereat from its associated switchhook, the switching apparatus 145 switches through in order to complete a connection between the calling subscriber substation T1 in the central office 10 and the called subscriber substation T3 in the remote exchange 20.

The release of this established connection is under the control of the subscriber at the calling subscriber substation T1 in the central office 10, and when the receiver of the telephone instrument thereat is returned to its associated switchhook, the hookswitch 12 is opened; thereby to interrupt the previously traced loop circuit extending between the calling subscriber substation T1 and the trunk circuit 150. The trunk circuit 150 is released effecting the release of the second selector 110, the first selector 50, the line switch 35 in the central office 10 and also the release of the switching apparatus 145 in the remote exchange 20.

In view of the foregoing description of the extension of a trunk call from the private subscriber substation T1 rendered non-restricted service, it will be understood that the extension of a trunk call from a party subscriber substation rendered non-restricted service will proceed in an identical manner. By way of illustration, it is noted that the extension of a trunk call from the calling party subscriber substation PT1 in the central office 10 rendered non-restricted service via the party subscriber line 170, the associated line switch 175, the trunk 60, the first selector 50, the trunk 130, the second selector 110, the trunk 160, the trunk circuit 150, the trunk line 140, the switching apparatus 145 and the subscriber line 146 to the called subscriber substation T3 in the remote exchange 20 is identical to that described above.

Now assume that a call has been initiated at the subscriber substation T2 rendered restricted service in the central office 10; that the line switch 45 has operated to select the trunk 60 extending to the first selector 50; that the first selector 50 has operated to select the trunk 130 extending to the second selector 110 and that the second selector 110 is conditioned to be responsive to the second digit dialed at a calling subscriber substation; and that the subscriber at the calling subscriber substation T2 continues to attempt to extend a connection to a called subscriber substation in the remote exchange 20. At this time the first selector 50 has responded to the first digit of the directory number of the called subscriber substation in the remote exchange 20 in order to select the trunk 130 extending to the second selector 110 as noted above; whereby the line relay R111 in the second selector 110 has operated to initiate operation of the timer 125 incorporated therein. Also the line conductors C41 and C42 of the subscriber line 40 are respectively poled + and − by the line relay R111 over the loop circuit extending between the calling subscriber substation T2 and the second selector 110. Accordingly, the device 25 bridging the impulsing springs 24 of the dial 23 at the calling subscriber substation T2 passes substantial current as a consequence of the present poling of the line conductors of the subscriber line 40 from the line relay R111 in the second selector 110; whereby the device 25 short-circuits the impulsing springs 24 of the dial 23. Consequently, the impulsing springs 24 of the dial 23 are rendered incapable of transmitting further impulses from the dial 23 at the calling subscriber substation T2 over the subscriber line 40. Thus the subscriber at the calling subscriber substation T2 cannot control the line relay R111 in the second selector 110; and further operation of the dial 23 at the calling subscriber substation T2 is without effect.

Shortly thereafter, the timer 125 in the second selector 110 completes its timing operation in order to effect operation of the signal relay R120; whereby the latter relay completes, at the contacts 121, an obvious path for connecting a signal tone current supplied by the signal tone transformer 122 to one of the line conductors of the trunk 130; which signal tone current is returned over the loop circuit to the calling subscriber substation T2 indicating to the subscriber thereat that the present call may not be completed to the called subscriber substation in the remote exchange 20. When the subscriber at the calling subscriber substation T2 then replaces the receiver of the telephone instrument thereat upon its associated switchhook, the hookswitch 22 is opened, interrupting the loop circuit extending between the calling subscriber substation T2 and the line relay R111 in the second selector 110. The line relay R111 then restores, thereby to effect the release of the second selector 110, the first selector 50 and the line switch 45 in the manner previously explained. Also upon restoring, the line relay R111 in the second selector 110 interrupts, at the contacts 112, the previously mentioned path for applying ground potential to the conductor extending to the timer 125; whereby the timer 125 is released bringing about the restoration of the signal relay R120. Upon restoring, the signal relay R120 interrupts, at the contacts 121, the previously traced path for returning signal tone current over the trunk 130. At this time, the connection between calling subscriber substation T2 and the second selector 110 is released and all of the apparatus employed therein is completely released and available for further use.

In view of the foregoing description of the manner in which a trunk call initiated at the private subscriber substation T2 rendered restricted service in the central office 10 is blocked in the second selector 110, it will be understood that a trunk call initiated at a calling party subscriber substation rendered restricted service in the central office 10 such, for example, as the party subscriber substation PT2 will be blocked in the second selector 110 in an identical manner.

Also, it will be appreciated that in the event the subscriber at a calling subscriber substation rendered non-restricted service initiates a trunk call and causes the extension thereof to the second selector 110 and then fails to dial the second digit of the directory number of the called subscriber substation in the remote exchange 20 that the timer 125 in the second selector 110 is operated in the manner explained above in order to effect operation of the signal relay R120 therein causing the return of signal tone current to the calling subscriber substation mentioned; all in the manner previously explained.

*Calls to the operator position 100 in the central office 10*

Since private subscriber substations rendered restricted service T2, etc., and party subscriber substations rendered restricted service PT2, etc., are not permitted to extend trunk calls directly from the central office 10 to called subscriber substations in the remote exchange 20, this result can be accomplished at the calling subscriber substations mentioned only with the aid of the operator at the operator position 100; and subscribers at calling subscriber substations rendered restricted service should extend connections directly to the operator position 100 and obtain the assistance of the operator thereat in the extension of calls to called subscriber substations in the remote exchange 20. However, the subscriber at any calling subscriber substation in the central office 10 may extend a call to the operator position 100 in order to obtain the assistance of the operator thereat in setting up toll calls or for information or assistance.

For example, the subscriber at the calling subscriber substation T1 rendered non-restricted service in the central office 10 may extend a connection by way of the subscriber line 30, the line switch 35, the trunk 60, the first selector 50 and the incoming trunk 90 to the trunk circuit 95 terminating the trunk 96 extending to the operator position 100 in an obvious manner. When the connection is thus extended to the trunk circuit 95, a signal is transmitted over the trunk 96 to the operator position 100; and when the operator thereat answers the call, a connection is completed to the calling subscriber substation T1. Thereafter, when the subscriber at the calling subscriber substation T1 replaces the receiver of the telephone instrument 11 thereat upon its associated switchhook, the hookswitch 12 is opened to interrupt a loop circuit substantially identical to that previously traced between the calling subscriber substation T1 and the trunk circuit 95; whereby the trunk circuit 95 is released effecting the release of the first selector 50 and the line switch 35. Also, the trunk circuit 95 transmits a release signal over the trunk 96 to the operator position 100; and the operator at the last mentioned position then takes down the connection to the trunk 96.

In view of the foregoing description of the extension of a connection from the calling subscriber substation T1 rendered non-restricted service in the central office 10 to the operator position 100 therein, it will be understood that calls from the subscriber substations T2, PT1, PT2 etc., in the central office 10 may be extended in an identical manner to the operator position 100 therein. In passing it is noted that calls from subscriber substations rendered restricted service such, for example, as the subscriber substations T2 and PT2 in the central office 10 to the operator position 100 therein, may be extended since dialing beyond the first selector 50 is not required in the extension of the calls mentioned.

*Conclusions*

In view of the foregoing, it is apparent that both restricted and non-restricted subscriber substations, whether they are connected to individual or party lines, may selectively control the automatic switching apparatus to complete local calls in the central office 10. However, only non-restricted subscriber substations, whether they are connected to individual or party lines, may selectively control the automatic switching apparatus to complete trunk calls to subscriber substations in the remote exchange 20. Moreover, it will be appreciated that any subscriber substation, whether it is connected to an individual line or a party line may be readily converted from non-restricted service to restricted service merely by changing the dial thereat, providing the subscriber substation with a dial has an asymmetrical current conducting device bridging the impulsing springs of the dial.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system including a first exchange provided with subscriber substations of first and second classes and a first switch accessible to said subscriber substations and a second switch accessible to said first switch and having access to said subscriber substations and a third switch accessible to said first switch, a second exchange, and a trunk extending between said exchanges and accessible to said third switch; each of said subscriber substations including a circuit and a digit transmitting mechanism provided with impulsing contacts serially arranged in said circuit, each of said subscriber substations of said second class also including an asymmetrical current conducting device bridging the impulsing contacts of the associated digit transmitting mechanism and arranged to block the passage therethrough of substantial current of a predetermined polarity, means including the digit transmitting mechanism at any calling subscriber substation for operating said first switch selectively to extend connections to said second switch and to said third switch, means included in said second switch for supplying current of said predetermined polarity to the circuit of the connected calling subscriber substation so that said second switch can be operated under the control of the digit transmitting mechanism at a calling subscriber substation of either of said classes in order to extend a connection to a called subscriber substation, and means included in said third switch for supplying current of the opposite polarity to the circuit of the connected calling subscriber substation so that said third switch can be operated under the control of the digit transmitting mechanism at a calling subscriber substation of said first class to extend a connection to said trunk but cannot be operated under the control of the digit transmitting mechanism at a calling subscriber substation of said second class to extend a connection to said trunk.

2. In a telephone system including subscriber substations of first and second classes, a first switch accessible to said subscriber substations, and second and third switches accessible to said first switch; each of said subscriber substations including a circuit and a digit transmitting mechanism provided with impulsing contacts serially arranged in said circuit, each of said subscriber substations of said second class also including an asymmetrical current conducting device bridging the impulsing contacts of the associated digit transmitting mechanism and arranged to block the passage therethrough of substantial current of a predetermined polarity, means including the digit transmitting mechanism at any calling subscriber substation for operating said first switch selectively to extend connections to said second switch and to said third switch, means included in said second switch for supplying current of said predetermined polarity to the circuit of the connected calling subscriber substation so that said second switch can be operated under the control of the digit transmitting mechanism at a calling subscriber substation of either of said classes, and means included in said third switch for supplying current of the opposite polarity to the circuit of the connected calling subscriber substation so that said third switch can be operated under the control of the digit transmitting mechanism at a calling subscriber substation of said first class but cannot be operated under the control of the digit transmitting mechanism at a calling subscriber substation of said second class.

3. In a telephone system including a subscriber substation, a first switch accessible to said subscriber substation, and second and third switches accessible to said first switch; said subscriber substation including a circuit and a digit transmitting mechanism provided with impulsing contacts serially arranged in said circuit and an asymmetrical current conducting device bridging said impulsing contacts and arranged to block the passage therethrough of substantial current of a predetermined polarity, means including said digit transmitting mechanism for operating said first switch selectively to extend connections from said subscriber substation to said second switch and to said third switch, means included in said second switch for supplying current of said predetermined polarity to said circuit when a connection is extended thereto from said subscriber substation so that said second switch can be operated under the control of said digit transmitting mechanism, and means included in said third switch for supplying current of the opposite polarity to said circuit when a connection is extended thereto from said subscriber substation so that said third switch cannot be operated under the control of said digit transmitting mechanism.

4. In a telephone system including a subscriber substation, a first switch accessible to said subscriber substation, and second and third switches accessible to said first switch; said subscriber substation including a circuit and a digit transmitting mechanism provided with impulsing contacts serially arranged in said circuit and an asymmetrical current conducting device bridging said impulsing contacts and arranged to block the passage therethrough of substantial current of a predetermined polarity, means including said digit transmitting mechanism for operating said first switch selectively to extend connections from said subscriber substation to said second switch and to said third switch, means including a line relay in said second switch for supplying current of said predetermined polarity to said circuit so that said line relay is operated when a connection is extended from said subscriber substation to said second switch and can be selectively controlled by said digit transmitting mechanism, and means including a line relay in said third switch for supplying current of the opposite polarity to said circuit so that said last-mentioned line relay is operated when a connection is extended from said subscriber substation to said third switch but cannot be selectively controlled by said digit transmitting mechanism.

5. In a telephone system including a subscriber substation, a first switch accessible to said subscriber substation, and second and third switches accessible to said first switch; said subscriber substation including a circuit and a digit transmitting mechanism provided with impulsing contacts serially arranged in said circuit and an asymmetrical current conducting device bridging said impulsing contacts and arranged to block the passage therethrough of substantial current of a predetermined polarity, means including said digit transmitting mechanism for operating said first switch selectively to extend connections from said subscriber substation to said second switch and to said third switch, means included in said second switch for supplying current of said predetermined polarity to said circuit when a connection is extended thereto from said subscriber substation so that said second switch can be operated under the control of said digit transmitting mechanism, means included in said third switch for supplying current of the opposite polarity to said circuit when a connection is extended thereto from said subscriber substation so that said third switch cannot be operated under the control of said digit transmitting mechanism, and timing means controlled by the failure of said third switch to operate within a predetermined time interval after a connection is extended thereto for returning a signal over the connection to said subscriber substation.

6. In a telephone system including a subscriber substation, a switch accessible to said subscriber substation and first and second channels accessible to said switch; said subscriber substation including a circuit and a digit transmitting mechanism provided with impulsing contacts serially arranged in said circuit and an asymmetrical current conducting device bridging said impulsing contacts and arranged to block the passage therethrough of substantial current of a predetermined polarity, means including said digit transmitting mechanism for operating said switch selectively to extend connections from said subscriber substation to said first channel and to said second channel, means included in said first channel for supplying current of said predetermined polarity to said circuit when a connection is extended thereto from said subscriber substation so that a subsequent digit from said digit transmitting mechanism can be transmitted into said first channel, and means included in said second channel for supplying current of the opposite polarity to said circuit when a connection is extended thereto from said subscriber substation so that a subsequent digit from said digit transmitting mechanism cannot be transmitted into said second channel.

7. In a telephone system including a party line serving subscriber substations of first and second classes, a first switch accessible by way of said party line to said subscriber substations, and second and third switches accessible to said first switch; each of said subscriber substations including a circuit and a digit transmitting mechanism provided with impulsing contacts serially arranged in said circuit, each of said subscriber substations of said second class also including an asymmetrical current conducting device bridging the impulsing contacts of the associated digit transmitting mechanism and arrangement to block the passage therethrough of substantial current of a predetermined polarity, means including the digit transmitting mechanism at any calling subscriber substation for operating over said party line said first switch selectively to extend connections to said second switch and to said third switch, means included in said second switch for supplying current of said predetermined polarity to said party line and thence to the circuit of the connected calling subscriber substation so that said second switch can be operated over said party line under the control of the digit transmitting mechanism at a calling subscriber substation of either of said classes, and means included in said third switch for supplying current of the opposite polarity to said party line and thence to the circuit of the connected calling subscriber substation so that said third switch can be operated over said party line under the control of the digit transmitting mechanism at a calling subscriber substation of said first class but cannot be operated over said party line under the control of the digit transmitting mechanism at a calling subscriber substation of said second class.

JOHN WICKS.

REFERENCES CITED

The following references are of record in the file of this patent:

UNITED STATES PATENTS

| Number | Name | Date |
|---|---|---|
| 826,090 | Doran | July 17, 1906 |
| 1,855,074 | Vigren | Apr. 19, 1932 |
| 1,899,014 | Christian | Feb. 28, 1933 |
| 2,052,057 | Reid | Aug. 25, 1936 |
| 2,170,403 | Goddard | Aug. 22, 1939 |
| 2,217,041 | Boswau | Oct. 8, 1940 |
| 2,248,575 | Lomax | July 8, 1941 |
| 2,278,172 | Dimond | Mar. 31, 1942 |
| 2,300,951 | Malthaner | Nov. 3, 1942 |
| 2,377,544 | Durkin | June 5, 1945 |